United States Patent [19]
Pecha

[11] 3,853,655
[45] Dec. 10, 1974

[54] METHOD OF AND FIXTURE FOR WELDING FLEXIBLE MEMBERS INTO A FRAME

[75] Inventor: Ernst Pecha, Grosbettlingen, Germany

[73] Assignee: Bielomatik Leuze & Co., Neuffen, Wurttemberg, Germany

[22] Filed: June 9, 1972

[21] Appl. No.: 261,241

[30] Foreign Application Priority Data
June 11, 1971 Germany............................ 2128922

[52] U.S. Cl................. 156/159, 156/296, 156/304, 156/306, 156/433, 156/544
[51] Int. Cl. ............................................ G03d 15/04
[58] Field of Search ........................... 156/157–159, 156/296, 304, 306, 423, 433, 544

[56] References Cited
UNITED STATES PATENTS
3,709,757   1/1973   Sturley............................... 156/423
FOREIGN PATENTS OR APPLICATIONS
842,782   7/1960   Great Britain...................... 156/304

Primary Examiner—William A. Powell
Attorney, Agent, or Firm—Brumbaugh, Graves, Donohue & Raymond

[57] ABSTRACT

A method and apparatus are disclosed for welding a plurality of flexible, elongated members, such as thermoplastic members, at their respective end points to form a frame. One-half of the members are arranged in receptacles in a holder with all the members being in a generally U-shaped configuration and in side-by-side relationship to one another. The remaining members are arranged in receptacles in a second holder which lies adjacent the first holder, with all members in this holder also being in a generally U-shaped configuration with one member partially surrounding all the other members which are situated in side-by-side relationship to one another within the U-shaped mouth of the member surrounding them. Each end portion of the members in one holder lies in the same horizontal plane as the end portion of the member in the other holder to which it is to be welded, and all members protrude outwardly from their respective holder and are pointed at the members to which they are to be welded at an angle corresponding to the internal angle at the corners of the frame which is to be formed. After at least one of the holders is moved to bring the end portions of one set of members in close proximity to the corresponding end portions in the other holder, the respective end portions are welded to one another by suitable welding apparatus, such as a welding mirror, to form a unitary frame.

9 Claims, 7 Drawing Figures

METHOD OF AND FIXTURE FOR WELDING FLEXIBLE MEMBERS INTO A FRAME

BACKGROUND OF THE INVENTION

1. Field of the Invention

The present invention relates to a method of and apparatus for welding elongated, flexible members, such as thermoplastic members, into a frame.

2. Description of the Prior Art

Heretofore, frames consisting of elongated, flexible members, such as thermoplastic sealing profiles used on refrigerator doors, have been individually and successively welded at all four corners. In such a method, however, the legs have to be clamped, heated, welded, and unclamped four successive times until the frames are completed. Such a method cannot be carried out automatically and gives a relatively slow rate of production and a consequent high cost for the frame that is produced.

Another known method comprises loading the individual members which form the legs of a frame and then simultaneously and automatically welding the corners to form the frame. However, this method has the disadvantage that the operator, who loads the legs and who then starts the automatic sequence of operations, must wait until the joints have been heated, welded, and cooled before he can remove the frame and initiate a new cycle with the loading of new legs.

It is therefore an object of the present invention to provide a method of and a fixture for simultaneously welding the corners of a frame which avoids the foregoing disadvantages of the prior art methods and fixtures.

SUMMARY OF THE INVENTION

The present invention is a method and apparatus in which one-half of the elongated, flexible members are placed in receptacles in a holder so that the members have a generally U-shaped configuration. The remaining members are placed in receptacles in a second holder adjacent the first holder. Each of the end portions of the members in one holder lies just opposite the particular end portion of the member in the other holder to which it is to be welded and points towards that member at an angle which corresponds to the internal angle formed by a corner in the frame which is to be formed. In order to form the frame, at least one of the holders is shifted to bring all end portions into close proximity and all are simultaneously welded to one another.

BRIEF DESCRIPTION OF THE DRAWINGS

The present invention is further understood by referring to the present specification and to the drawings which form a portion of the specification and which are appended hereto wherein.

DESCRIPTION OF PREFERRED EMBODIMENTS

Figure 1:
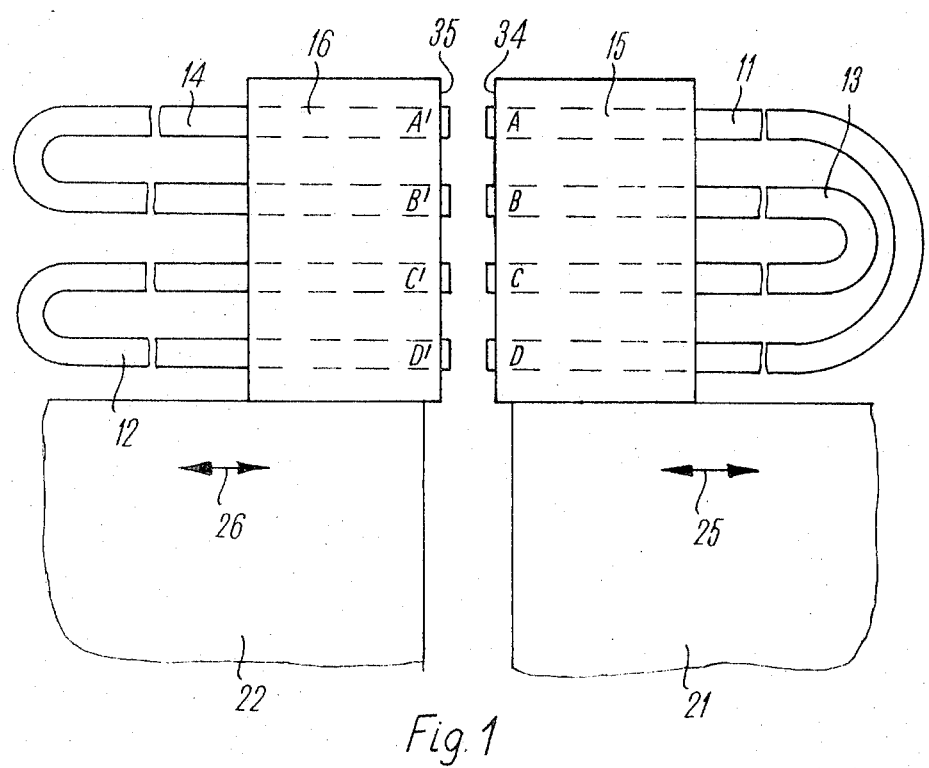
FIG. 1 is a side view of two holders which form a part of the apparatus of the present invention.
Figure 2:
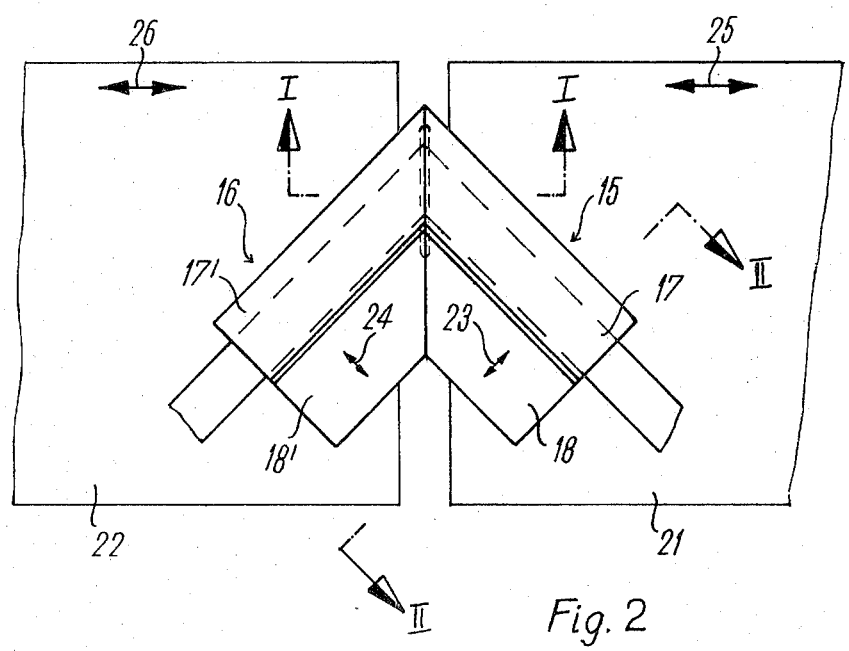
FIG. 2 is a top view showing two receptacles in the holders of the present invention.

The apparatus of the present invention as depicted in FIG. 1 comprises two holders 15 and 16 which are mounted on two conventional machine frames 21 and 22, respectively. The machine frames 21 and 22 comprise the means to move the holders 15 and 16 and are only shown in part. At least one of the machine frames 21 and 22 is movable towards and away from each other in the direction of the double arrows 25 and 26. The holder 15 in a preferred embodiment has four receptacles A, B, C, D and the holder 16 also has four corresponding receptacles A', B', C', D'. The receptacles A, A' are located in one horizontal plane, and the same applies to the receptacles B, B', C, C', and D, D'. All receptacles are pointed towards one another at an angle of 90° as best seen in FIG. 2. These receptacles serve to accommodate the end portions of four flexible members which are preferably formed of thermoplastic material and which when welded together at their end portions form a frame. The ends of the members 11 and 13 are inserted into the receptacles A, D and B, C of the holder 15, respectively, and the ends of the members 12 and 14 are inserted into the receptacles C', D' and A', B', respectively, of the holder 16. After insertion, the ends of the members 11–14 project from the contact surfaces 34 and 35 of the holders 15 and 16, respectively.

In order to form a four-legged frame, the members 11 to 14 must be inserted into the holders 15 and 16 as shown in FIG. 1. In this arrangement one end portion of the member 11 lies opposite an end portion of the member 12, and the other end of the member 12 lies opposite an end portion of the member 13. The other end of the member 13 lies opposite one end of the member 14, and the other end of the member 14 lies opposite the other end of the member 11. The reference numerals of the members 11, 12, 13 and 14 are chosen so as to designate in a cyclical sequence the four legs of the frame to be formed. It is absolutely necessary that the insertion scheme shown in FIG. 1 be followed because insertion of the members 11 to 14 in a different order would result either in formation of two ring-like configurations or a joggled frame. The members 11–14 may all be of equal length if a square frame is desired, or they may be in pairs of equal lengths if a rectangular frame is desired.

The invention scheme comprises having one-half of the members, i.e., the members 12 and 14, arranged in side-by-side relationship and in a U-shaped configuration in the holder 16. The other holder 15 contains the member 11 which is arranged in such a way so that its two ends A and D lie opposite the outer ends A' and D' of the members 12 and 14. This member 11 partially surrounds the member 13 and both the members 11 and 13 are in a U-shaped configuration. Each end portion of one of the members 11–14 lies in the same horizontal plane and at an angle of 90° to the end of the respective end portion of the other member to which it is to be welded.

The method and apparatus can of course be modified to weld together frames made up of a larger number of members. For example, a six-member frame is formed when three members are inserted in side-by-side relationship in one holder, e.g., holder 16, with three members being placed in the other holder so that two are in side-by-side relationship within the U-shaped mouth of a surrounding member. Each end of the members lies in the same horizontal plane as, and at an angle of 120° to, the end of the other member to which it is to be welded.

To weld eight members into a frame, four members are inserted in side-by-side relationship in one holder and the remaining are placed in the other holder with three being in side-by-side relationship to one another and one surrounding these three. All members are in a generally U-shaped configuration. The end portions of the members lie in the same plane as, and at an angle of 135° to, the end portion of the other member to which it is to be welded.

Figure 5:
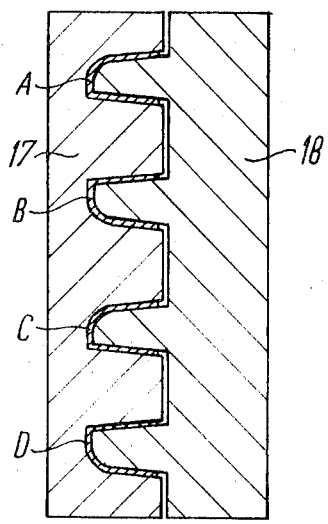
FIG. 5 is a sectional view along line II—II of FIG. 2.
Figure 4:
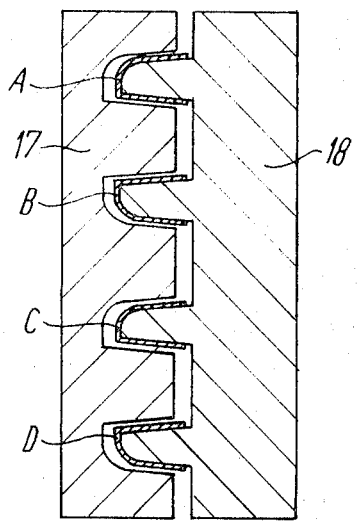
FIG. 4 shows a holder in the position of insertion.
Figure 6:
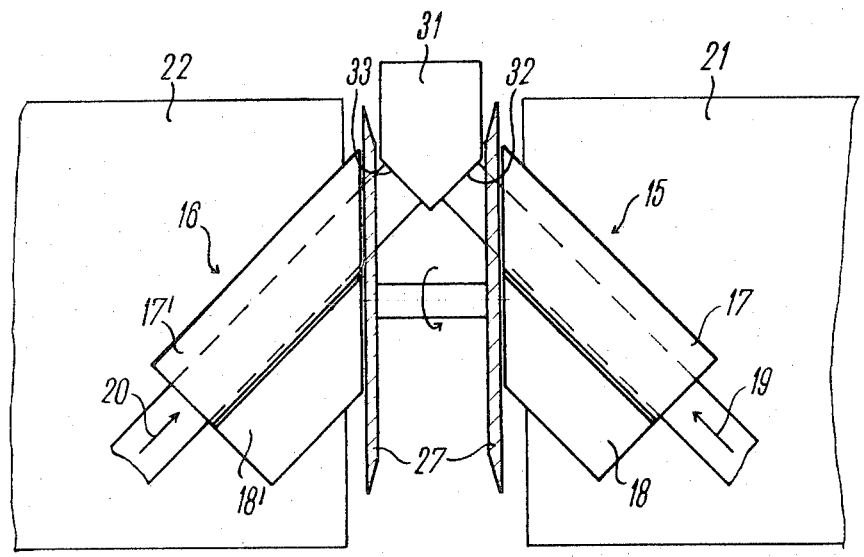
FIG. 6 is a top view of rotating circular knives which can be used to meter the ends of the flexible members.
Figure 7:
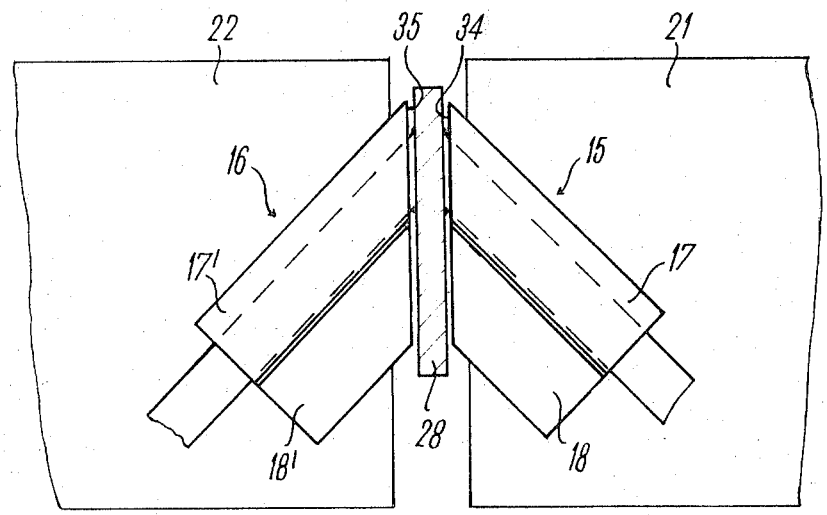
FIG. 7 shows a heating mirror which is moved between the holders to fuse the ends of the flexible members.

The holders 15 and 16 used in practicing any of the preferred embodiments of the invention comprise two halves 17, 18 and 17', 18', respectively, as shown in FIGS. 2, 6 and 7. The holder half 17 is firmly mounted on the machine frame 21, and the holder half 17' on the machine frame 22. The holder halves 18 and 18', in a preferred embodiment, are shiftable in the direction of the double arrows 23 and 24. The profiles of the holder halves 17 and 18 gear into each other as shown in FIGS. 4 and 5. FIG. 4 shows the holder halves 17 and 18 in the position they occupy when members 11–14 are inserted in the holders. At this position they are several millimeters apart due to the thickness of the member to be processed. When moved together, the holder halves 17 and 18 form the receptacles A, B, C and D. The flexible members to be processed are inserted into these accommodations, in the direction of arrow 19, as shown in FIG. 6. In a similar manner the end portions of the members are inserted in the direction of the arrow into the receptacles A', B', C' and D' of the holder 16. To facilitate the process of inserting the members, trumpet-shaped widenings (not shown) facing in the direction of insertion are provided. FIG. 6 shows a stop 31 with two stop faces 32 and 33, which form an angle of 90°. This stop serves to simplify the operation of inserting the members in the holders. However, it is not an absolute necessity that these stop members be provided since members can be used which, after extrusion, have been accurately cut to the desired length. Some well-trained operators, in addition, have no difficulty in inserting members accurately in the holder to within one or two millimeters of the correct position without the aid of stop means. Even the presence of such small dimensional variations in the finished frame is of no great consequence due to the flexibility of the material of the member.

FIG. 6 shows two rotating circular knives 27 situated between holders 15 and 16 with which the members are metered or cut to the proper length. The circular knives 27 have a serration formed by grinding to aid them in cutting through the flexible material. After the members 11–14 have been cut to the proper length, the rotary knives 27 are tilted out of the position shown so as to free the space between the holders 15 and 16.

It is also possible to use members which have been metered prior to their insertion as mentioned above so that the rotary knives 27 are not needed for the manufacture of the frame.

FIG. 7 shows a suitable welding apparatus 28, e.g., a welding mirror, which may be placed into the space between the holders 15 and 16 when the flexible members comprise a thermoplastic material. This welding mirror 28 is of known design having an aluminum heating coil, and it serves to plasticize the ends of the thermoplastic members. The welding can be carried out either by moving the members into close proximity, i.e., about 1 mm., to the mirror 28, or directly against the mirror 28. If the member is formed of a low-viscosity thermoplastic material the former is preferred to prevent sticking of the material to the mirror.

A fillet 29 is formed in contact surfaces 34 and 35 around the receptacles A, A', B, B', C, C', and D, D' in order to remove the excess portion of material formed during the welding together of the members when the holders 15 and 16 are moved towards each other and make contact.

Figure 3:
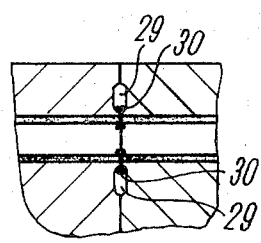
FIG. 3 is a sectional view taken along line I—I of FIG. 2.

The apparatus of the present invention operates in a relatively simple manner. In order to allow insertion of the members 11, 12, 13 and 14 which, in the preferred embodiment are used to form a four-legged frame, the machine frames 21 and 22 are moved into the position shown in FIG. 6. At the same time the holder halves 18 and 18' are moved away from the holder halves 17 and 17', respectively, into the position shown in FIG. 4. The members 11–14 are now inserted as shown in FIG. 1, and the holder halves 18 and 18' are again moved towards the holder halves 17 and 17', respectively. Thereafter, if necessary, the rotary knives 27 are rotated and moved between the holders 15 and 16 to meter the members. After the rotary knives 27 have been removed from the space between holders 15 and 16, the welding mirror 28 is placed into this space and the machine frames 21 and 22 are moved towards each other to urge the ends of the members 11–14 against the heating mirror 28. The machine frames 21 and 22 at this point move against a stop (not shown) in order to insure that an accurately dimensioned fusion of the ends of the members 11–14 is achieved during the welding operation. After the heating of the member ends the heating mirror 28 is moved back and the frames 21 and 22 are moved together for welding until the contact surfaces 34 and 35 of the holders 15 and 16 meet as shown in FIG. 2. The weld reinforcement 30 shown in FIG. 3 is then sheared off by the fillet 29.

After a preset cooling period, the holder halves 17 and 18 are opened and the machine frames 21 and 22 are moved apart so that the finished welded frame can be taken out.

The whole sequence after the insertion of the members 11, 12, 13 and 14 into the holders 15 and 16 takes place automatically. The movements of the machine frames 21 and 22, of the holders 15 and 16, of the stop 31, of the rotary knives 27, and of the heating mirror 28, are controlled with the aid of limit switches, while the heating, welding, and cooling times are controlled with adjustable watches.

In a further preferred embodiment of the invention, two or more processing stations with two holders each are arranged on a rotary table.

The inventive method and the inventive fixture have another advantage in that they can be used to manufacture frames of any different size. For the manufacture of frames of different sizes, it is not even necessary to specially adjust the holders for each frame size. Another advantage achieved by the invention results from the arrangement of different processing stations on a rotary table. After the insertion and the indexing of the rotary table to the next position with which the following automatic sequence is simultaneously switched on, the operator immediately has two holders of the next processing station at his disposal. Thus, the operator can work without interruption and there is no idle time. Compared with conventional methods, the method in accordance with the invention makes possible up to a fourfold increase of output.

I claim:

1. A method of welding together flexible, elongated members at their respective end points to form a frame comprising:
 a. placing one-half of the flexible members in a first holder and the remaining flexible members in a second holder adjacent said first holder, each of the flexible members being placed in the holders in a generally U-shaped configuration such that the first holder contains at least two of the flexible members in side-by-side relationship whereas the second holder contains at least one flexible member lying, at least in part, within the U-shaped mouth of one other flexible member and such that the respective end portions of the members which are to be welded to one another to form the frame lie adjacent each other;
 b. moving at least one of said holders towards the other holder to bring pairs of each of the respective end points of the flexible members into a position which allows them to be welded to one another; and
 c. simultaneously welding the respective end portions to one another to form the frame.

2. A method as claimed in claim 1 wherein the first holder contains three flexible members and the second holder contains two flexible members within the U-shaped mouth of one other flexible member, the end portions of each member lying in the same horizontal plane as the member to which it is to be welded and pointing towards the end portion of that member at an angle of about 120°.

3. A method as claimed in claim 1 wherein the first holder contains four flexible members in side by side relationship and the second holder contains three flexible members within the U-shaped mouth of one other flexible member, the end portions of each member lying in the same horizontal plane as the member to which it is to be welded and pointing towards the end portion of that member at an angle of about 135°.

4. A method according to claim 1 which further comprises cutting all end portions which are to be welded to proper size.

5. A method as claimed in claim 1 wherein the flexible members comprise thermoplastic material.

6. A method according to claim 5 wherein the end portions of each member project from their respective holder about an equal distance and are moved in close proximity to a welding apparatus by movement of the holders to heat them until they are at least partially plasticized.

7. A method according to claim 5 wherein the end portions of each member project from their respective holder about an equal distance and are moved into contact with a welding mirror by relative movement of the holders to heat them until they are at least partially plasticized.

8. A method as claimed in claim 1 which comprises placing the flexible members in the holders so that their respective end portions point in the same direction and project outwardly from the holder about the same distance.

9. A method as claimed in claim 8 wherein each holder contains two flexible members, the end portions of the members which are to be welded to one another lying in the same horizontal plane and pointing towards one another at an angle of 90°.

* * * * *